R. E. ADREON.
PIPE CLAMP AND HANGER.
APPLICATION FILED FEB. 18, 1907.
918,639.
Patented Apr. 20, 1909.
2 SHEETS—SHEET 1.
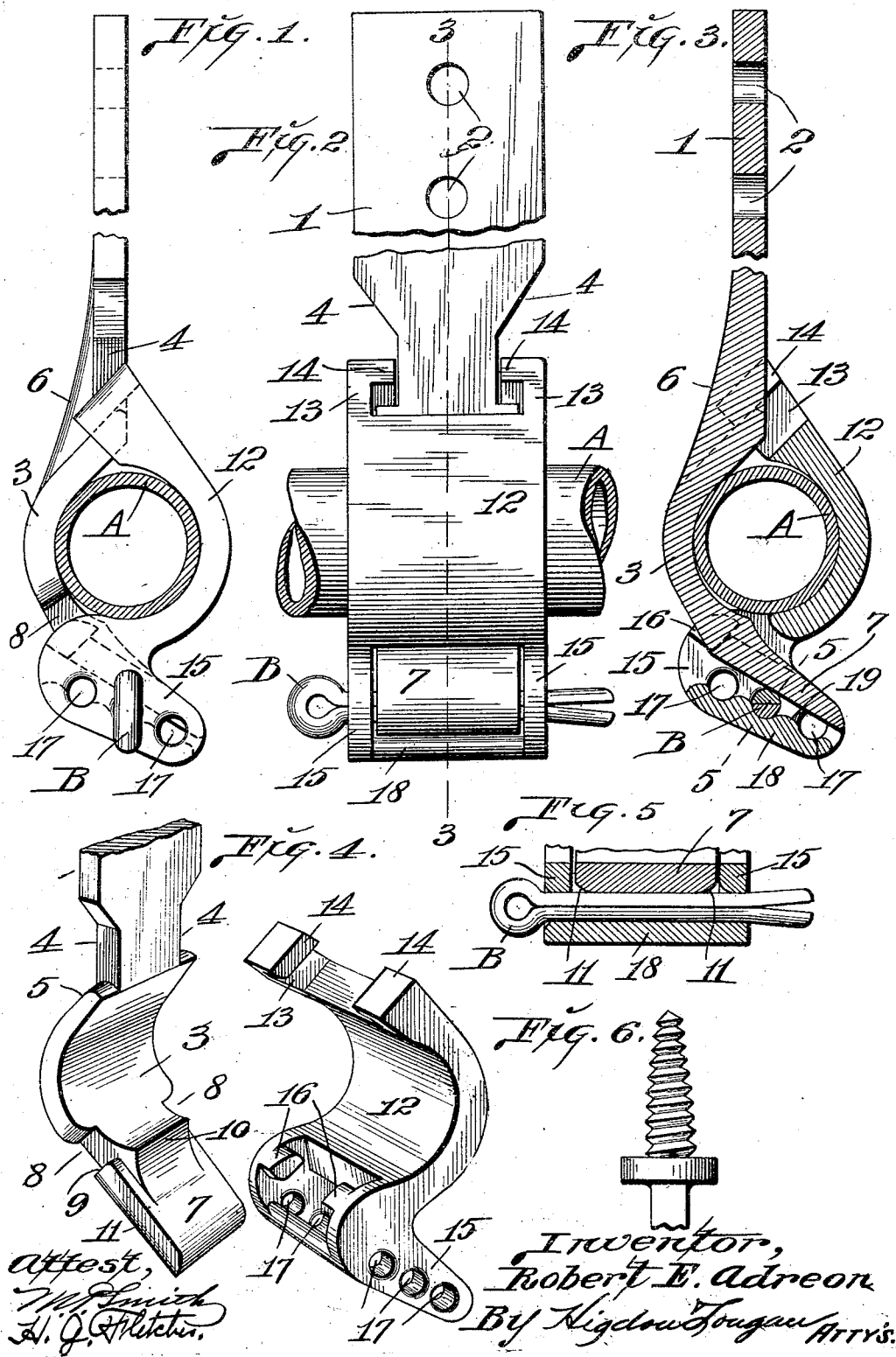
Inventor,
Robert E. Adreon
By Higdon Longan Attys.
Attest:

R. E. ADREON.
PIPE CLAMP AND HANGER.
APPLICATION FILED FEB. 18, 1907.
918,639.
Patented Apr. 20, 1909.
2 SHEETS—SHEET 2.
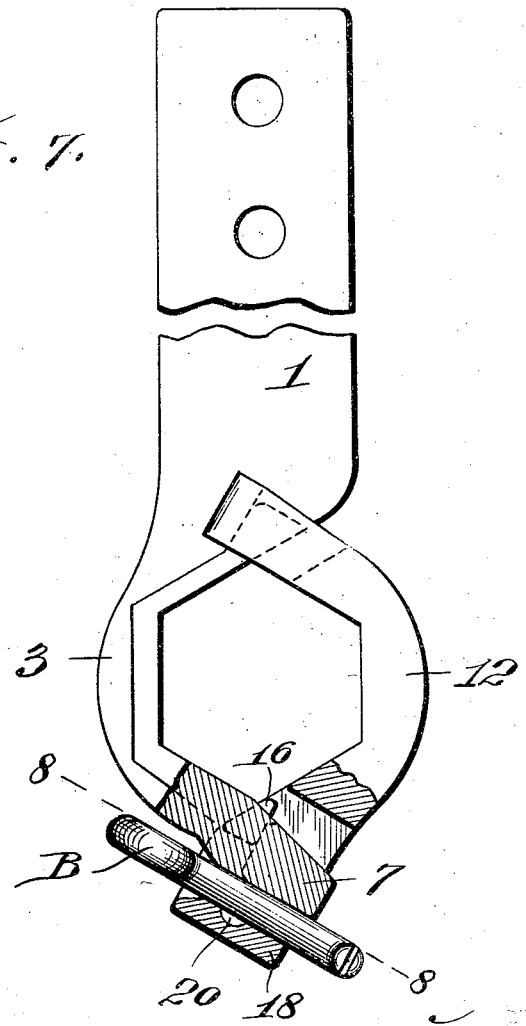
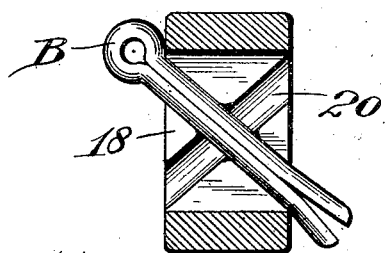
Inventor,
Robert E. Adreon,
By Higdon Longan
attys

UNITED STATES PATENT OFFICE.

ROBERT E. ADREON, OF ST. LOUIS, MISSOURI.

PIPE CLAMP AND HANGER.

No. 918,639.   Specification of Letters Patent.   Patented April 20, 1909.

Application filed February 18, 1907. Serial No. 358,035.

*To all whom it may concern:*

Be it known that I, ROBERT E. ADREON, a citizen of the United States, and resident of St. Louis, Missouri, have invented certain new and useful Improvements in Pipe Clamps and Hangers, of which the following is a specification containing a full, clear, and exact description, reference being had to the accompanying drawings, forming a part hereof.

My invention relates to a pipe clamp and hanger, and has for its object the construction and arrangement of a simple and inexpensive device particularly adapted for use in clamping the train pipes and fittings of air brake and steam heating systems, which clamp is so constructed as to be easily and quickly assembled or taken apart, and the members of which clamp are drawn tightly against the pipe and held in a clamping position without the use of bolts and nuts, which latter tend to loosen and become detached as a result of vibration.

Where bolts and nuts are utilized as a means of drawing the parts of a clamp together, and causing them to grip a pipe, much time and labor is involved in assembling or detaching the members of the clamp; whereas, in my improved device, a spring key or cotter is made use of, which very effectually locks the parts of the clamp together, and at the same time draws the two members of the clamp together in order to very tightly grip the pipe and maintain the same a inst both rotary and longitudinal movement.

My improved clamp and hanger consists of a pair of interlocking members, one of which is fixed in any suitable manner to the car body, and which members move to and from one another by the arrangement of oppositely disposed lugs having similarly inclined faces, and said members being locked together and clamped upon the pipe by a single pin or spring cotter, which is easily and quickly inserted or removed.

My invention further consists in certain novel features of construction and arrangement of parts, which will be hereinafter more fully set forth, pointed out in the claims, and illustrated in the accompanying drawings, in which:—

Figure 1 is a side elevation of the clamp and hanger, and showing a pipe engaged thereby; Fig. 2 is a front elevation of the clamp and hanger; Fig. 3 is a vertical section taken on the line 3—3 of Fig. 2; Fig. 4 is a perspective view of the two parts of the clamp, the same being separated, or detached; Fig. 5 is a transverse section taken on the line 5—5 of Fig. 3; Fig. 6 is a detail view showing a modification of the upper end of one of the members of the clamp, and showing the same provided with a screw threaded shank for engaging in a timber of the car frame; Fig. 7 is an elevation, partly in section, of a modified form of the clamp, and such as is adapted for engaging a noncircular fitting; Fig. 8 is a section taken on the line 8—8 of Fig. 7; Fig. 9 is an elevation of the lower end of this form of the clamp.

Referring by reference characters to the accompanying drawings:—1 designates a vertically disposed plate, the upper end of which is perforated, as designated by 2, in order that said plate may be bolted to a portion of the car frame, and formed integral with the lower end of the plate is a semi-circular plate 3, the upper end of which is inclined, preferably at an angle of approximately 45°, and the side of the plate 1 where it joins with said plate 3 is cut away or notched, as designated by 4, thus forming inclined shoulders 5 on the upper side of the plate 3. A strengthening rib 6 is formed integral with the rear face and lower end of the plate 1, and extends downwardly onto the inclined upper end of the plate 3; and formed integral with the lower end of the plate 3 is a downwardly pending inclin·d tongue or plate 7, there being notches 8 formed between the upper end of said plate and the lower end of the curved plate 3, thus forming inclined shoulders 9 at the upper end of said plate 7, which are disposed at the same angle as are the shoulders 5.

Formed integral with the top surfaces of the plates 3 and 7 is a lug 10, which is equal in width to the width of that portion of the plate 3 between the notches 8, and the upper surface of said lug 10 is formed by a continuation of the curved inner surface of the plate 3. The lower corners of the plate 7, at the sides thereof, are rounded off, or beveled inwardly, as designated by 11, in order to guide the ends of a spring cotter or key, (hereinafter described.)

The clamping member of the device comprises a semi-circular plate 12, the upper end of which is provided with a pair of upwardly projecting ears 13, and formed integral with the upper ends of said ears are the inwardly projecting lugs 14, the lower faces of which engage the inclined shoulders 5 of the plate 3 when the parts of the device are assembled.

Formed integral with the lower end of the plate 12, at the sides thereof, are the vertically disposed plates 15, and formed integral with the inner faces of said plates, at the upper ends thereof, are lugs 16, the lower faces of which are inclined and engage the shoulders 9 at the upper end of the plate 7 when the device is assembled.

Formed through the plates 15 are the oppositely disposed pairs of apertures 17, and formed integral with said plates and uniting the lower ends thereof is the transversely arranged plate 18, the top side of which is provided with transversely arranged ribs 19, between the apertures 17.

When my improved clamp and hanger is in use, the plate 1 is rigidly fixed to the car body, and the pipe A is positioned against the inner faces of the curved plate 3. The clamping member, comprising the plate 12 and parts integral therewith, is now positioned against the outside of the pipe with the plates 15 inclosing the tongue 7, which tongue passes between the lugs 16 and the rear end of the plate 18 when the two members of the device are assembled, thus bringing the shoulders 9 against the under side of the lugs 16. During this action, the upper end of the plate 12 is so manipulated as that the lugs 14 engage over the shoulders 5 at the upper end of the plate 3, and the clamping plate 12 is now moved toward the plate 3 at an angle corresponding to the engaging faces of the lugs 14 and 16 and shoulders 5 and 9 until the plate 12 clamps the pipe against the plate 3, after which a key or spring cotter B is inserted through one pair of apertures 17; and on being driven between the top surface of the plate 18 and the under side of the tongue 7 tends to force said tongue and plate apart, which action causes the plate 12 to move toward the plate 3, thus causing said plates to very tightly grip the pipe and maintain it against both rotary and longitudinal movement.

The lower edges of the plate 7 are rounded or beveled, as designated by 11, in order to guide the ends of the split key or cotter beneath said plate 7; and, if desired, the apertures 17 may be reamed or tapered in order that the key or cotter will be readily guided therethrough when forced into position.

By providing a plurality of pairs of apertures 17, the clamp is made adjustable so that it may be tightened on pipes of various sizes.

The plate 12 moves to and from the pipe and the opposite plate 3 when being tightened or loosened by reason of the inclination of the interlocking lugs 14 and 16 and shoulders 5 and 9, and said plates are very rigidly locked together and tightly clamped upon the pipe by means of the spring key or cotter, thus dispensing with the use of bolts and nuts, which latter very quickly work loose as a result of vibration, and are much more expensive than a key or cotter.

In some instances, the upper end of the plate 1 may be provided with a screw threaded shank, (as shown in Fig. 6,) which arrangement permits said plate to be screwed into a portion of the car frame.

In a modified form of the device, (as shown in Figs. 7 to 9, inclusive,) the plates 3 and 12 are constructed to be clamped onto a hexagonal part or fitting of the air brake or heating system, such as is often found on a cock or valve, and the spring key or cotter may be made to pass diagonally between the tongue 7 and plate 18, instead of being transversely positioned as in the construction previously described. Where this form of the device is employed, a pair of grooves 20, of different depths are formed in the top face of the plate 18, which grooves cross one another, which arrangement provides for a clamping action the entire width of the plate by the spring key or cotter, when the same is positioned in one of said grooves. While this manner of positioning the key or cotter is shown in connection with the form of device seen in Figs. 7 to 9, inclusive, it will be understood that the key or cotter may be used in the same manner with the form of device shown in Figs. 1 and 6, inclusive, the principles by which the clamping action is obtained being the same in both cases; the only difference being the direction in which the key or cotter is inserted.

My improved device performs the function of both a clamp and hanger, comprises but three pieces, including the locking key or cotter, is easily and quickly assembled or taken apart, and very rigidly clamps and supports a pipe.

I claim:—

1. A pipe clamp and hanger, comprising a pair of interlocking semi-circular plates, inclined shoulders formed on the sides of one of the plates, hook shaped lugs formed on the opposite plate which inclose and bear upon the inclined shoulders of the opposite plate, a pair of interlocking plates integral with the semi-circular plates, and means arranged between the interlocking plates whereby the semi-circular plates are caused to move toward one another to engage and clamp a pipe.

2. A pipe clamp and hanger, comprising a pair of interlocking plates, shoulders formed on one of said plates, which shoulders are provided with inclined faces, hook shaped lugs formed on the opposite plate, which lugs are provided with inclined faces corresponding to the inclined faces on the shoulders, and which lugs engage over the shoulders to permit the plates to slide to and from one another, extending members integral with the plates, and a locking member arranged between said extending members for drawing the interlocking plates toward one another to clamp a pipe.

3. In a device of the class described, a hanger, a plate integral with the lower end thereof, a tongue integral with the lower end of the plate, there being inclined shoulders formed on said plate, a clamping plate, lugs integral therewith which engage on the inclined shoulders, a housing integral with the second plate which receives the tongue of the first plate, and means detachably positioned between the bottom of the housing and the tongue for causing the second plate to move toward the first plate to engage and clamp a pipe positioned between said plates.

In testimony whereof, I have signed my name to this specification, in presence of two subscribing witnesses.

ROBERT E. ADREON.

Witnesses:
M. P. SMITH,
E. L. WALLACE.